United States Patent [19]

Vezirian

[11] 4,176,724
[45] Dec. 4, 1979

[54] ROTARY ROCK BIT AND METHOD OF MAKING SAME

[75] Inventor: Edward Vezirian, Fountain Valley, Calif.

[73] Assignee: Smith International, Inc., Newport Beach, Calif.

[21] Appl. No.: 851,475

[22] Filed: Nov. 14, 1977

[51] Int. Cl.$^2$ ............................................. E21B 9/08
[52] U.S. Cl. ................................. 175/369; 76/108 A; 175/371
[58] Field of Search ............... 308/8.2; 175/367–370, 175/371, 372, 375, 374; 219/121 EB; 76/108 R, 108 A, 101 E, DIG. 5

[56] References Cited

U.S. PATENT DOCUMENTS

| 1,325,086 | 12/1919 | Godbold | 175/368 |
| 1,641,261 | 9/1927 | Fletcher | 175/371 |
| 1,647,753 | 11/1927 | Scott et al. | 175/368 |
| 1,692,793 | 11/1928 | Reed | 175/369 |
| 1,694,869 | 12/1928 | Scott et al. | 175/369 |
| 1,858,980 | 5/1932 | Behnke | 175/368 |
| 3,907,191 | 9/1975 | Lichte | 175/375 |
| 3,917,361 | 11/1975 | Murdoch | 308/8.2 |
| 3,971,600 | 7/1976 | Murdoch et al. | 308/8.2 |
| 4,043,411 | 8/1977 | Lichte | 175/369 |
| 4,098,150 | 7/1978 | Penny et al. | 76/108 A |
| 4,127,043 | 11/1978 | Evans | 175/369 |

FOREIGN PATENT DOCUMENTS 1260582 4/1961 France .................................. 308/8.2

*Primary Examiner*—James A. Leppink
*Assistant Examiner*—Richard E. Favreau
*Attorney, Agent, or Firm*—Robert M. Vargo

[57] ABSTRACT

A rotary rock bit is described having a plurality of legs extending downwardly from the main bit body. Each leg further includes an inwardly extending journal pin for rotatively supporting a cone-type cutter. An annular thrust member is provided for axially retaining the cutter onto the journal pin. In one embodiment the thrust member is adapted to extend into an annular groove formed in the journal pin with the other radial surface thereof engaging an inner annular surface of the cutter. The radial surface of the thrust member is then welded to cutter by an electron beam process. An access aperture is provided in the journal pin and leg to enable the electron beam to pass therethrough and strike the thrust member and cutter. During this operation, the cutter is rotated along with the thrust member across the access aperture to create a 360° weld therebetween. In another embodiment, an annular groove is formed in the cutter cavity for receiving the thrust member. An access hole is formed in the cutter to enable the electron beam to pass therethrough and strike the engaging surfaces of the thrust member and journal pin. Similarly, relative rotational movement of the components enables a 360° weld to be created.

31 Claims, 5 Drawing Figures

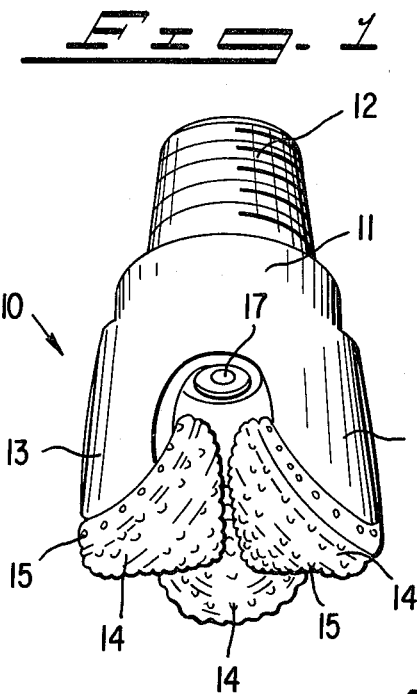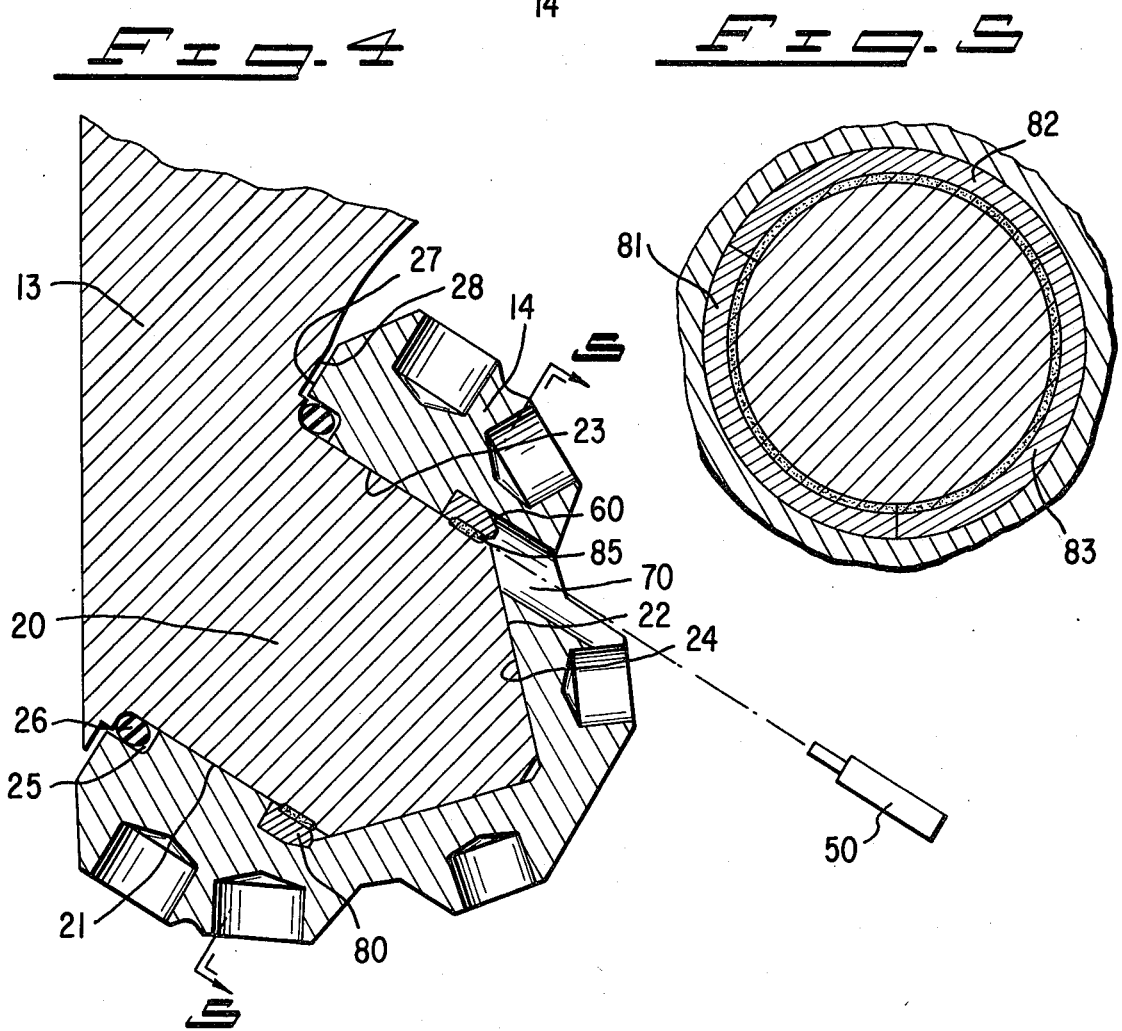

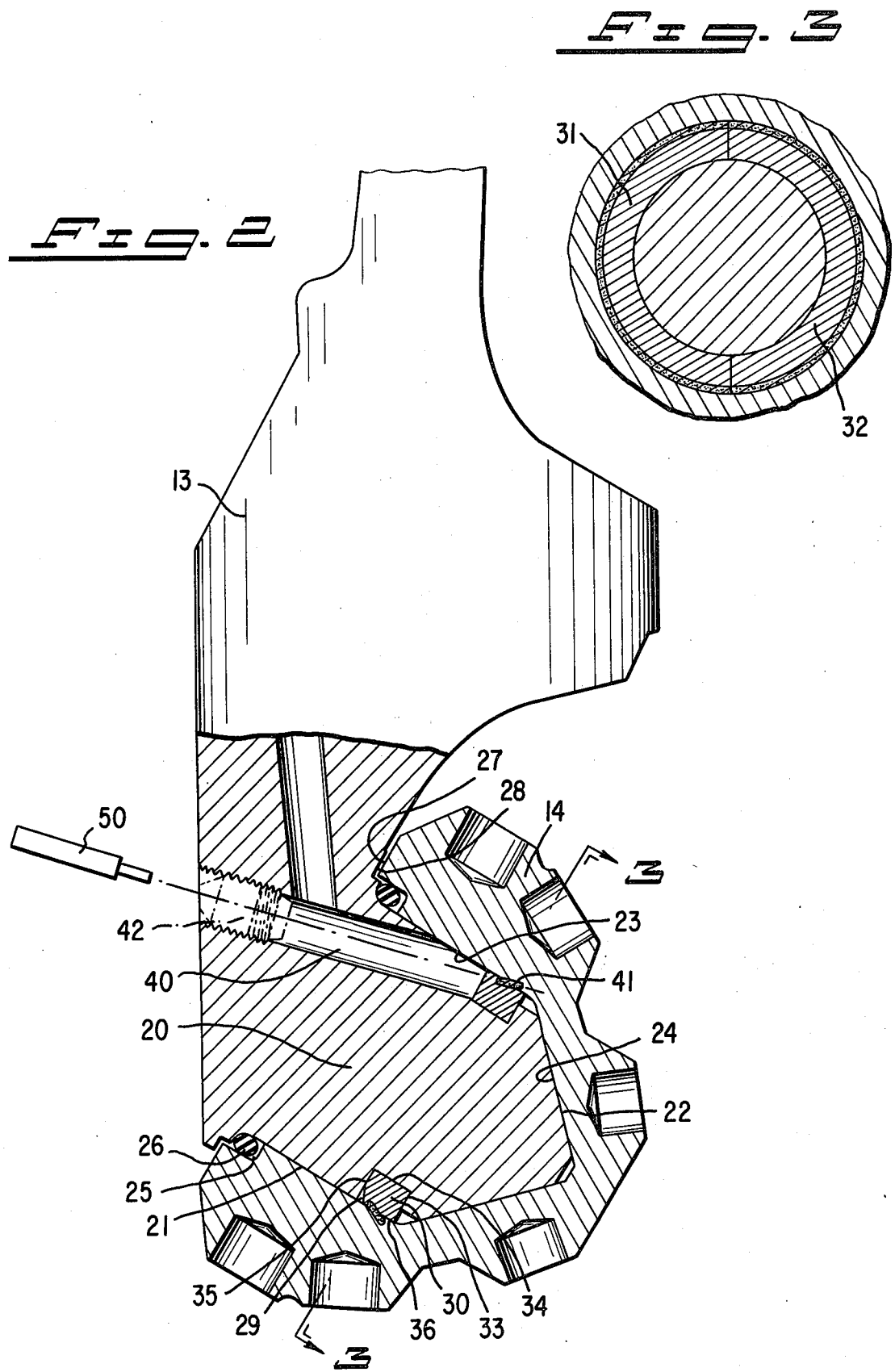

ROTARY ROCK BIT AND METHOD OF MAKING SAME

BACKGROUND OF THE INVENTION

1. Field of the Invention

The present invention relates generally to earth boring rock bits and, more particularly, to rock bits in which the cone-type cutters are axially secured to the journal pins by means other than ball bearings.

2. Description of the Prior Art

A rotary rock bit usually comprises a plurality of legs welded together to form a bit body having one end threaded for attachment to a drill string. The lower end of each leg extends downwardly from the bit body and includes a journal pin extending radially inwardly for rotatively supporting a cone type cutter. Each cutter is adapted to roll along the bottom of the bore and is adapted to contact and disintigrate the earth formation at the bore bottom.

Present day rock bits usually include ball bearings located between the journal pin and the cutter to provide some thrust bearing support and to retain the cone on the journal pin. However, these ball bearings are not capable of absorbing axial thrust loads in either axial direction of the journal pin. Therefore, their main utility is for retention only. Other problems with utilizing ball bearings is that during operation the cone has an undesirable rocking movement and an in and out-thrust movement.

Alternatives to the ball bearings have been utilized in retaining the cutter onto the journal pin. One alternative is the utilization of an annular thrust member which is retained on the journal pin and secured to the cutter. Such thrust members are shown in U.S. Pat. Nos. 959,540, 979,496, 1,010,144, 1,010,407, 1,119,163, 1,124,241, 1,484,995, 1,692,793, 1,720,401 and 3,971,600. The shortcoming with these devices is that the annular thrust members have to be threadedly secured to the cutter. Such threaded connections are not desirable because of the hostile environment the cutters are subject to. These threads create high stress areas due to the sharp corners forming the threads thereby making the whole area susceptible to cracking and breaking. Moreover, special machines and tools are required to manufacture threads and to threadedly tighten the annular thrust members during assembly. The use of such tools is akward and positive tightening of the various members is not always guaranteed. Also, threaded details tend to loosen when the rock bit is in use.

SUMMARY OF THE INVENTION

The present invention obviates the above-mentioned shortcomings by providing a rotary rock bit in which the cutter is axially retained on the journal pin by an annular thrust member that is welded to either the cutter or journal pin. The welding is accomplished by an electron beam process which beam passes through access holes either in the journal pin or the cutter to fuse the engaging surfaces of the thrust member to either the cutter or journal pin.

A primary advantage of the present invention is that the positive retention created by the greater surface contact area of the annular thrust member greatly increases the bit's in-thrust capacity. It has been shown that the in-thrust capacity has increased substantially more than a standard friction bearing utilizing ball bearing retention means. As a result, cutter loss is practically eliminated, if not completely.

Another advantage of the present invention is that the thrust member retainer will also substantially increase the out-thrust and radial load capacities of the bearing system. As a result, cutter movement will be reduced or eliminated when the tool is in use.

Still another advantage of the present invention is that the weld attachment greatly reduces the stress areas in the journal pin and cutter otherwise created by prior art threaded thrust members.

The features of the present invention, which are believed to be novel, are set forth with particularity in the appended claims. The present invention, both as to its organization and manner of operation, together with the further advantages thereof, may best be understood by reference to the following description taken in connection with the accompanying drawings.

BRIEF DESCRIPTION OF THE DRAWINGS

FIG. 1 is a perspective view of a three cone rotary rock bit constructed in accordance with the present invention;

FIG. 2 is a sectional view of one leg of the rock bit of FIG. 1, showing the first embodiment of the present invention;

FIG. 3 is a fragmentary sectional view of the rock bit taken along lines 3—3 of FIG. 2;

FIG. 4 is a fragmentary sectional view of one leg of a rotary rock bit illustrating a second embodiment of the present invention; and FIG. 5 is a fragmentary sectional view of the rock bit taken along lines 5—5 of FIG. 4.

DESCRIPTION OF THE PREFERRED EMBODIMENTS

Referring now to the drawings, FIG. 1 illustrates a three cone rotary rock bit generally indicated by arrow 10, having a bit body 11 which includes an upper threaded portion 12 for connection to the lower end of a rotary drill string (not shown). Extending from the bit body 11 are three substantially identical legs 13. The lower end of each of the legs is provided with an extended journal pin, details of which will be discussed hereinafter. Three rotary cone cutters 14 are rotatively positioned upon the three journal portions of the leg 13. Each of the cone cutters includes a cutting structure 15 on its outer face which is adapted to disintigrate the earth formations as the bit is rotated and moved downward. The cutting structure 15 is shown in the form of tungsten carbide inserts, however, it is to be understood that other cutting structures such as milled steel teeth with or without hard metal, may be formed on the cone cutters.

The bit 10 further includes central passageway 16 extending along the center axis of body 11 to allow drilling fluid to enter from the upper section of the drill string immediately above and pass downward through three jet nozzles 17, one of which is shown in FIG. 1.

In operation, the drill bit 10 is connected as a lower member of a rotary drill string (not shown) and lowered into a well bore until the rotatable cone cutters 14 engage the bottom of the well bore. Prior to and during engagement with the bottom well bore the drill string is rotated, rotating bit 10 therewith. Drilling fluid is forced down through the interior passage of the rotary drill string and continues through the central passageway 16 of the bit 10, passing through the three nozzles 17, past the cutting structure 15 of the cutters 14 to the bottom of the well bore, and then upwardly into the annulus between the rotary drill string and the wall of the well bore carrying with it the cuttings and debris from the drilling operations.

FIG. 2 illustrates one of the legs 13 which includes a journal pin 20 projecting therefrom. The journal pin 20 includes a cylindrical bearing surface 21 and a truncated conical surface 22. The cutter 14 includes a concave cavity comprising a radially inward facing cylindrical bearing surface 23 and a similarly facing conical bearing surface 24. As stated previously, the cutter 14 is rotatively mounted on the journal pin 20 with the cutter bearing surfaces 23 and 24 frictionally engaging the bearing surfaces 21 and 22 of the journal pin 20. The interengaging bearing surfaces 21 and 23 function to transfer the radial loads from the cutter 14 to the journal pin 20 while the conical bearing surfaces 22 and 24 transfer the out-thrust and radial loads.

The bases of the journal pin 20 and cutter 14 cooperate to form an annular seal chamber 25 which functions to house a resilient seal 26. The cutter 14 further includes an end face 27 which could frictionally engage the bearing surface 28 on the leg 13 to further absorb some of the out-thrust loads passing therethrough.

The cylindrical bearing surface 21 of the journal pin 20 further includes an annular groove 29 for receiving an annular thrust member 30. As shown in FIG. 3 the thrust member 30 comprises two semi-cylindrical members 31 and 32 forming a split circular ring. The thrust members 31 and 32 each includes three bearing surfaces 33, 34 and 35 which frictionally engage the sides of the groove 29. The thrust members 31 and 32 each further includes an outwardly bearing surface 36 which frictionally engages the cylindrical bearing surface 23 of the cutter 14.

The leg 13 further includes an access aperture 40 formed therein extending from the backface of the leg 13 and through the journal pin 20 to expose the area adjacent the interengaging surfaces 23 and 36 of the cutter and thrust member 30 respectively. During the manufacturing process, the aperture 40 is open and after the cutter assembly is assembled, as shown in FIG. 2, a gun 50, such as an electron beam welder, is provided to direct a high energy beam through the aperture 40 to strike the aforementioned interengaging surfaces and fuse a weld 41 between the cutter 14 and the thrust member 30. During the welding operation, after the initial weld is made, the cutter 14 is rotated. Since the thrust member 30 is fused to the cutter 14, it also rotates in unison across the end of the aperture 40 to enable a 360° weld to be formed between the cutter 14 and the thrust member 30.

By being fused to the cutter 14 and being constrained within the groove 29, the thrust member 30 functions to axially restrain the cutter 14. The bearing surfaces 33, 34 and 35 further function to transfer the radial, in-thrust and out-thrust loads from the cutter 14 to the journal pin 20.

After the welding process is complete, a threaded plug 42 shown in phantom is utilized to plug the aperture 40. Afterwards the aperture 40 can be utilized as part of the lubrication system in a manner similar to the conventional ball bearing fill hole. Moreover, the threaded opening can be utilized as a fill hole, i.e., a connection for a hose for the purpose of injecting the grease into the lubrication system.

FIGS. 4 and 5 illustrate a second embodiment of the present invention. In this embodiment, the numerals identical to those used in FIGS. 2 and 3 are again utilized to denote substantially identical components. The differences in the second embodiment are that a groove 60 is formed in the cutter 14 rather than the journal pin 20, and an aperture 70 is formed in the cutter 14 to enable the gun 50 to direct a high energy beam to the interengaging surfaces of the journal pin 20 and the thrust member 80 to fuse a weld 85 therebetween.

As shown in FIG. 5, the thrust member 80 comprises three 120° sections 81, 82 and 83 forming a complete annular member.

During the welding process, after the initial weld is made, the journal pin 20 and the thrust member 80 are relatively moved across the aperture 70 to enable a 360° weld to be formed. After the welding process is completed a plug (not shown) is then provided to plug the aperture 70.

As a result, the thrust member 80 again functions to axially restrain the cutter 14 while transferring the radial, in-thrust and out-thrust loads passing therethrough.

A lubrication system is also provided for the second embodiment, although it is not shown since it does not form a part of the invention and is conventional in construction.

As can be seen, a positive means is provided to axially constrain the cutter 14 and transfer the loads passing therethrough and a novel welding process is provided to securely bond the means to the cutter assembly.

It should be noted that various modifications can be made to the assembly while still remaining within the purview of the following claims. For example, the angle and orientation of the access apertures is not restricted to those shown in the drawings. Such apertures could have various orientations as long as they provide access to the weld area.

What is claimed is:

1. A rotary rock bit comprising a main bit body having at least one leg extending downwardly therefrom and a cutter assembly, said cutter assembly comprising:
   a journal pin projecting from said leg, said journal pin having a cylindrical bearing surface and an annular groove formed thereon;
   a cutter element rotatively supported on said journal pin, said cutter element having a radially inward bearing surface frictionally engaging the bearing surface of said journal pin;
   an annular thrust member mounted within the groove formed in said journal pin, said thrust member having an outer radial surface engaging the bearing surface of said cutter element, said thrust member including at least one surface which engages a bearing surface of said journal pin for transferring the in-thrust load from the said cutter element to said journal pin; and
   a weld fusing substantially the entire engaging surfaces of said thrust member and said cutter element.

2. The combination of claim 1 wherein said thrust member further includes a second surface engaging a second bearing surface of said journal pin for transferring the out-thrust load from the cutter element to the journal pin.

3. The combination of claim 1 wherein said thrust member further includes a third surface engaging a third bearing surface of said journal pin for transferring the radial loads from the cutter element to the journal pin.

4. A rotary rock bit comprising a main bit body having at least one leg extending downwardly therefrom and a cutter assembly, said cutter assembly comprising:
   a journal pin projecting from said leg, said journal pin having a cylindrical bearing surface;
   a cutter element rotatively supported on said journal pin, said cutter element having a radially inward bearing surface frictionally engaging the bearing surface of said journal pin, said cutter element further having a groove formed therein;
   an annular thrust member mounted within the groove formed in said cutter element, said thrust member having an inner radial surface engaging the bearing surface of said journal pin;
   a weld fusing the engaging surfaces of said thrust member and said journal pin; and
   an aperture formed in said cutter element to provide access from the weld area to the exterior of the cutter assembly during the welding operation.

5. The combination of claim 4 wherein said thrust member includes at least one surface which engages a bearing surface of said cutter element for transferring a bearing load therethrough.

6. The combination of claim 5 wherein said one surface transfers the in-thrust load from the cutter to the journal pin.

7. The combination of claim 5 further including a second surface engaging a second bearing surface of a respective cutter element for transferring the out-thrust load from the cutter element to the journal pin.

8. The combination of claim 5 further including a third surface engaging a third bearing surface of a respective cutter element for transferring the radial loads from the cutter element to the journal pin.

9. A method of manufacturing a rotary rock bit, said rock bit including a main bit body having at least one leg extending downwardly therefrom, a journal element projecting from said leg, said journal element having a bearing surface formed thereon, and a cutter element rotatively supported on said journal element, said cutter element having a radially inward bearing surface engaging the bearing surface of said journal element, said method comprising the steps of:
   forming a groove on the bearing surface of one of the elements;
   providing an annular thrust member within said groove, said thrust member having a pair of surfaces engaging the bearing surfaces of the journal element and the cutter element;
   forming an aperture within the one element extending from the exterior of the one element to the area of the engaging surfaces of said thrust member and the other element; and
   directing a high energy beam through said aperture to fuse substantially the entire interengaging surfaces of said thrust member and the other element.

10. The method of claim 9 wherein the one element is the journal element whereby the access aperture is formed in said journal element and the high energy beam is directed therethrough to fuse the interengaging surfaces of said thrust member.

11. The method of claim 9 wherein the one element is the cutter element whereby the access aperture is formed in said cutter element and the high energy beam is directed therethrough to fuse the interengaging surfaces of said thrust member and said journal element.

12. A rotary rock bit comprising a main bit body having at least one leg extending downwardly therefrom and a cutter assembly, said cutter assembly comprising:
   a journal element projecting from said leg;
   a cutter element rotatively supported on said journal element;
   an annular thrust member extending around said journal element for axially retaining said cutter element on said journal element;
   means associated with said cutter element for receiving a portion of said thrust member; and
   a weld fusing said thrust member to said journal element.

13. The combination of claim 12 wherein said receiving means includes an annular groove formed in said cutter element for at least partially receiving said thrust member.

14. The combination of claim 12 further including an aperture formed in said cutter element to provide access from the weld area to the exterior of the cutter assembly during the welding operation.

15. The combination of claim 12 wherein said journal element includes a cylindrical bearing surface.

16. The combination of claim 15 wherein said cutter element further includes a radially inwardly facing cylindrical bearing surface engaging said bearing surface of said journal element.

17. The combination of claim 16 wherein said cutter element further includes an annular groove formed around said bearing surface for receiving said thrust member.

18. The combination of claim 17 wherein said thrust member includes three 120° arcuate sections forming a cylindrical ring.

19. The combination of claim 17 wherein said thrust member includes an inner radial surface engaging the cylindrical bearing surface of said journal element.

20. The combination of claim 19 wherein said weld is formed between the engaging inner radial surface of said thrust member and the cylindrical bearing surface of said journal element.

21. A rotary rock bit comprising a main bit body having at least one leg extending downwardly therefrom and a cutter assembly, said cutter assembly comprising:
   a journal element projecting from said leg;
   a cutter element rotatively supported on said journal element;
   an annular thrust member extending around said journal element for axially retaining said cutter element on said journal element;
   means associated with said journal element for receiving a portion of said thrust member;
   a weld fusing said thrust member to said cutter element; and
   an aperture formed in said leg and journal element to provide access from the weld area to the exterior of the cutter assembly during the welding operation.

22. The combination of claim 21 wherein said receiving means includes an annular groove formed in said journal element for at least partially receiving said thrust member.

23. The combination of claim 21 wherein said journal element further includes an annular groove formed around said bearing surface for receiving said thrust member.

24. The combination of claim 23 wherein said thrust member includes two semi-cylindrical members forming a split ring.

25. The combination of claim 24 wherein said thrust member includes an outer radial surface engaging a bearing surface formed with said cutter element.

26. The combination of claim 25 wherein said weld is formed between the engaging outer radial surface of said thrust member and the bearing surface of said cutter element.

27. The combination of claim 21 wherein said journal element includes a cylindrical bearing surface.

28. The combination of claim 27 wherein said cutter element further includes a radially inwardly facing cylindrical bearing surface engaging said bearing surface of said journal element.

29. A rotary rock bit comprising a main bit body having at least one leg extending downwardly therefrom and a cutter assembly, said cutter assembly comprising:
   a journal element projecting from said leg, said journal element having a cylindrical bearing surface;
   a cutter element rotatively supported on said journal element, said cutter element further having a radially inwardly facing cylindrical bearing surface engaging said bearing surface of said journal element, said cutter element further having an annular groove formed in and around said bearing surface;
   an annular thrust member extending around said journal element for axially retaining said cutter element on said journal element, said thrust member partially extending into the annular groove formed in said cutter element, said thrust member further including an inner radial surface engaging the cylindrical bearing surface of said journal element; and
   a weld formed between the engaging inner radial surface of said thrust member and the cylindrical bearing surface of said journal element.

30. A rotary rock bit comprising a main bit body having at least one leg extending downwardly therefrom and a cutter assembly, said cutter assembly comprising:
   a journal pin projecting from said leg, said journal pin having a cylindrical bearing surface and an annular groove formed thereon;
   a cutter element rotatively supported on said journal pin, said cutter element having a radially inward bearing surface frictionally engaging the bearing surface of said journal pin;
   an annular thrust member mounted within the groove formed in said journal pin, said thrust member having an outer radial surface engaging the bearing surface of said cutter element;
   a weld fusing the engaging surfaces of said thrust member and said cutter element; and
   an aperture formed in said leg and journal pin to provide access from the weld area to the exterior of the cutter assembly during the welding operation.

31. The combination of claim 30 wherein said aperture includes a threaded opening for receiving a threaded hose connection for the purpose of injecting grease into the lubrication system and for receiving a threaded plug after the welding process and grease filling process is completed.

* * * * *